United States Patent [19]

Orthman

[11] 4,074,766
[45] Feb. 21, 1978

[54] FLOATING FOLDING TOOL BAR HAVING A LOCK MEANS

[75] Inventor: Henry K. Orthman, Lexington, Nebr.

[73] Assignee: Orthman Manufacturing Inc., Lexington, Nebr.

[21] Appl. No.: 689,384

[22] Filed: May 24, 1976

[51] Int. Cl.² ........................................... A01B 49/00
[52] U.S. Cl. ................................. 172/311; 172/414; 172/457; 172/466; 172/494
[58] Field of Search ............... 172/311, 452, 456, 478, 172/491, 132, 624, 414, 457, 466, 494, 666

[56] References Cited

U.S. PATENT DOCUMENTS

| 3,774,693 | 11/1973 | Orthman | 172/311 |
| 3,941,194 | 3/1976 | Orthman | 172/311 |
| 3,944,001 | 3/1976 | Warner et al. | 172/311 |
| 3,948,327 | 4/1976 | Parker et al. | 172/311 |

Primary Examiner—George J. Marlo
Attorney, Agent, or Firm—Zarley, McKee, Thomte, Voorhees & Sease

[57] ABSTRACT

A farm implement tool bar includes a main frame section having a wing section pivotally connected thereto and operated by a hydraulic cylinder located in a passageway in the main frame. The pivotal connection between the hydraulic cylinder and the wing section includes a lost motion connection to allow the wing section to float above and below the horizontal when the wing section is in its extended position. Cooperating lock members on the cylinder and wing section engage when the wing section is pivoted from the extended position to an angular position to limit pivotal movement of the wing section independently of the cylinder.

4 Claims, 5 Drawing Figures

U.S. Patent  Feb. 21, 1978  4,074,766
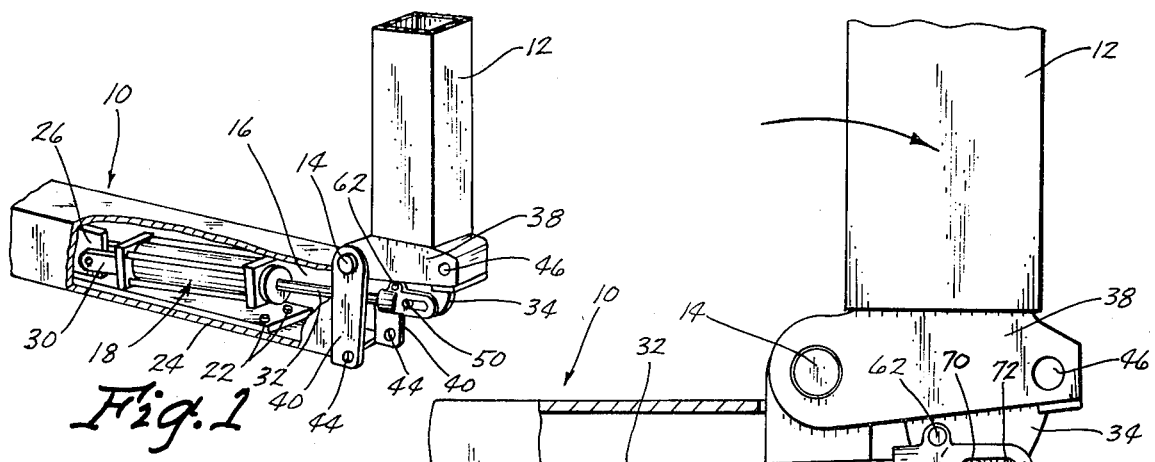
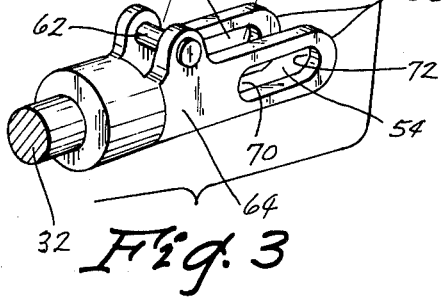
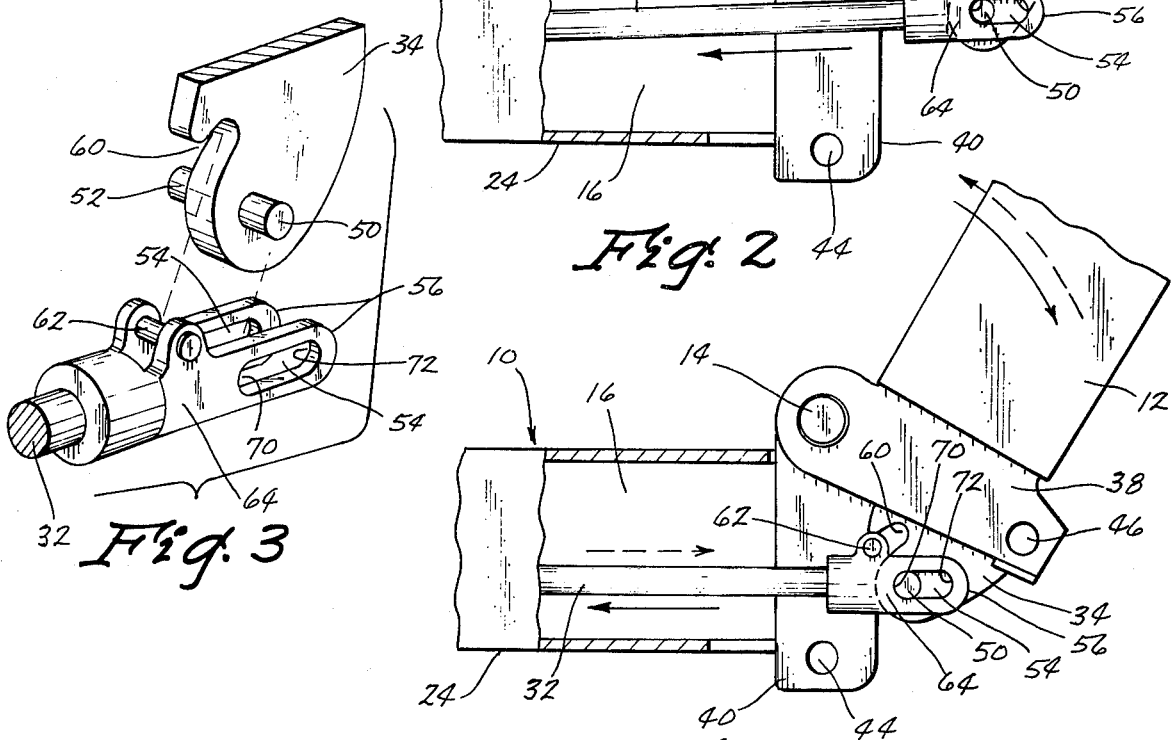
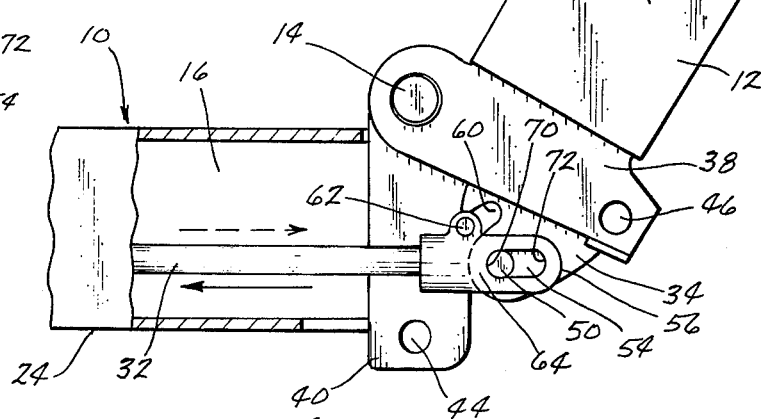
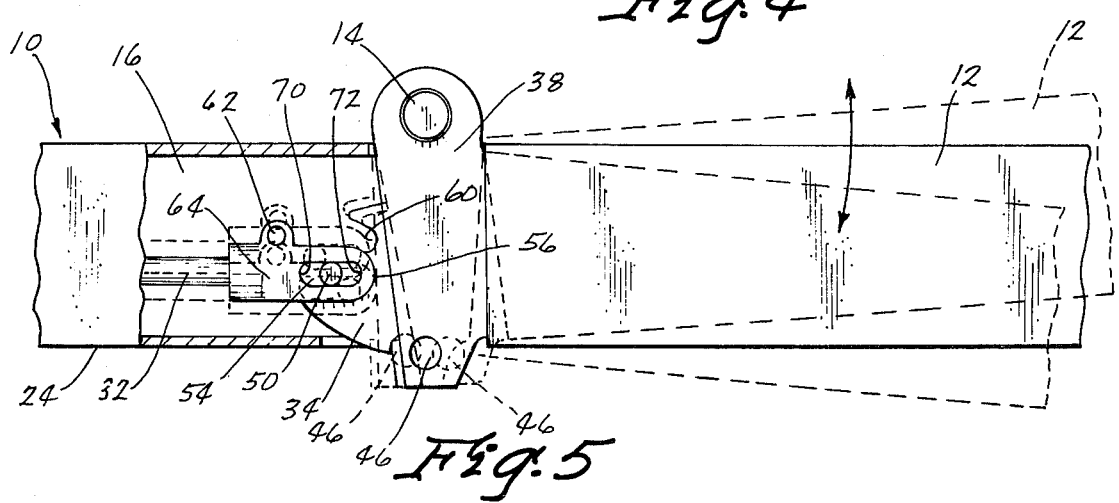

FLOATING FOLDING TOOL BAR HAVING A LOCK MEANS

BACKGROUND OF THE INVENTION

It is desirable for a tool bar to have folding capabilities so that it may flex in the field and follow the contour of the ground and also so that it may be folded for transport. However, in order for it to flex in the field the hydraulic cylinder piston has to move in the cylinder thereby transferring oil back through the tractor hydraulic system. If the prime mover tractor does not have this float capability the bar will not be able to flex any more than the slack will allow resulting from wear on the pins in the linkage. Accordingly, a linkage is needed that will allow for flexing when the bar is in an extended position to follow the contour of the ground without operation of the hydraulic cylinder but will not freely pivot independently of the cylinder when in a transport position. Free pivotal movement in the transport position could cause damage to the tool bar and hydraulic cylinder and injury to the operator.

SUMMARY OF THE INVENTION

The tool bar of this invention includes a lost motion connection between the hydraulic cylinder and the wing section whereby a pin carried on the wing section is free to move the length of a slot on the hydraulic cylinder in pivoting above and below the horizontal as the bar moves over the contour of the ground. Cooperating lock means are provided on the wing section and hydraulic cylinder which engage when the wing section is moved substantially from the extended working position to a raised transport position. The locking means limits pivotal action of the wing section independently of operation of the hydraulic cylinder thereby eliminating any free play of the wing section which could damage the hydraulic cylinder or tool bar and operator. The cooperating lock means includes a slot on the wing section which opens towards the hydraulic cylinder and receives a pin on the hydraulic cylinder when the wing section has moved approximately 60 degrees from its extended position.

DESCRIPTION OF THE DRAWINGS

FIG. 1 is a fragmentary perspective view of a tool bar having a hydraulic cylinder in the main frame and showing the wing section in its angular transport position.

FIG. 2 is an enlarged side elevation view showing the pivotal connection between the hydraulic cylinder and the wing section.

FIG. 3 is an exploded perspective view of the pivot connection between the hydraulic cylinder and the ear on the wing section.

FIG. 4 is a view similar to FIG. 2 but showing the wing section at an approximately 60 degree angle relative to the extended position and further illustrating the cooperating lock means at the point of engagement.

FIG. 5 is a fragmentary side elevation view of the tool bar with the wing section in an extended position and illustrated in dash lines pivoting above and below the horizontal.

A folding tool bar having a hydraulic cylinder in the main frame section for operating the wing section has been previously disclosed in my patents, AGRICULTURAL IMPLEMENT, U.S. Pat. No. 3,774,693, Nov. 27, 1973, and FOLDING TOOL BAR HAVING A TRANSPORT BRACE, U.S. Pat. No. 3,941,194, Mar. 2, 1976.

DETAILED DESCRIPTION OF THE INVENTION

The tool bar of this invention includes a main frame 10 and a wing section 12 pivotally connected by a pin 14 offset from the longitudinal centerline axis of the tool bar when in its extended position of FIG. 5. The main frame 10 is formed from square or rectangular tubing which includes an elongated passageway 16 in which a hydraulic cylinder 18 is positioned. The cylinder 18 is connected to the main frame by a mounting plate having mounting bolts 22 connected to a bottom wall 24 of the main frame. An upstanding centrally positioned mounting plate 26 is positioned inside the passageway 16 and is pivotally connected to clevis plates 30 on the inner end of the cylinder 18. A piston rod 32 extends out of the passageway 16 for pivotal connection to an ear 34 on the adjacent end of the wing section 12. The hinge connection between the main frame 10 and the wing section 12 is through a pair of hinge plates 38 in the hollow wing section 12 and a pair of plates 40 connected to the outside of the main frame 10 such that the plates 38 pivot on the pin 14 between the plates 40. The ear 34 is connected to an end plate extending between the hinge plates 38. The wing section 12 may be locked in an extended position by a pin not shown being positioned in holes 44 and 46 in the hinge plates 40 and 38, respectively, which are adapted to register, as seen in FIG. 5.

The ear 34 includes a transversely extending pin 50 having oppositely extending ends 52 received in elongaged slots 54 in clevis portions 56 formed on the end of the hydraulic cylinder piston rod 32. This hinge connection between the cylinder 18 and the wing section 12 allows for free pivotal movement independently of operation of the hydraulic cylinder such that the wing section 12 may move above and below the horizontal as indicated by the dash lines in FIG. 5 to allow the wing sections to follow the contour of the ground.

Between the hinge pin 14 for the hinge connection between the main frame 10 and the wing section 12, is a locking slot 60 which opens toward the piston rod 32 and is adapted to receive a transversely extending pin 62 on the top of the clevis 64 when the wing section 12 has pivoted to approximately 60° from its extended position, as seen in FIG. 4. Further pivotal movement to the 90° position of FIG. 2 causes the pin 62 to move fully into the slot 60. When the pin 62 is in the slot 60 the wing section 12 cannot pivot freely independently of the hydraulic cylinder 18 as it does in the extended position of FIG. 5. Thus the wing section 12 is locked in its raised upstanding position of FIG. 2 until the hydraulic cylinder has moved the wing section downwardly to a point where the cooperating lock means, the pin 62 and the slot 60 are separated as in FIG. 5.

It is noted in operation that as the wing section 12 is being raised the hydraulic cylinder is pushing against the ear 34 through the pin 50 engaging the inner end 70 of the slot 54. When the wing section is in its extended position of FIG. 5 the pin 50 is free to move between the inner end 70 of the slot 54 and an outer end 72. When the wing section 12 is being lowered there would be a tendency without the cooperating lock means 50 and 62 for the wing section 12 to remain upright until the pin 50 had moved to the outer end 72 of the slot 54 thereby setting up a situation where the wing section 12 could fall from its raised position to a position limited by the pin 50 engaging the inner end 70 of the slot 54. Severe damage would be caused to the hinge connection and the tool bar if not to the operator as well. The cooperating lock means in the form of the pin 62 being received in the slot 60 eliminates this hazardous condition when the wing section 12 is raised and is automatically inoperative when the wing section 12 is in its extended working position of FIG. 5.

It is understood that while the tool bar disclosed shows the hydraulic cylinder inside the main frame the pivotal connection between the cylinder and the wing section could be incorporated in a tool bar having the hydraulic cylinder externally mounted.

I claim:

1. An agricultural implement comprising,
    a tool bar including a main frame and at least one wing section, said wing section being pivotally movable between extended and angular positions,
    a lost motion hinge pivotally interconnecting said wing section and said main frame whereby said wing section is free to pivot through a predetermined angle when in said extended position,
    a hydraulic cylinder connected at one end to said main frame and pivotally connected at its opposite end to said wing section at a point remote from the pivotal axis of said hinge,
    said wing section including an ear connected to said cylinder and having a slot opening towards said cylinder, and
    a pin on said cylinder positioned to move into said slot when said wing section is moved substantially out of said extended position towards said angular position thereby limiting free pivotal movement of said wing section independently of said cylinder.

2. The structure of claim 1 wherein said pin enters said slot upon said wing having pivoted approximately 60° from said extended position.

3. The structure of claim 1 wherein said main frame includes an elongated passageway in its end adjacent said wing section and said cylinder is positioned in said passageway.

4. The structure of claim 3 wherein said ear extends into said passageway in said main frame when said wing section is in said extended position.

* * * * *